US009104956B2

(12) United States Patent
Araya

(10) Patent No.: US 9,104,956 B2
(45) Date of Patent: Aug. 11, 2015

(54) IMAGE PROCESSING APPARATUS AND IMAGE PROCESSING METHOD THAT SELECTIVELY STORES DATA IN PREFERRED STORAGE PLACES

(71) Applicant: KYOCERA Document Solutions Inc., Tamatsukuri, Chuo-ku, Osaka-shi, Osaka (JP)

(72) Inventor: Takeshi Araya, Osaka (JP)

(73) Assignee: Kyocera Document Solutions Inc. (JP)

( * ) Notice: Subject to any disclaimer, the term of this patent is extended or adjusted under 35 U.S.C. 154(b) by 20 days.

(21) Appl. No.: 14/138,483

(22) Filed: Dec. 23, 2013

(65) Prior Publication Data

US 2014/0185099 A1 Jul. 3, 2014

(30) Foreign Application Priority Data

Dec. 27, 2012 (JP) ................................ 2012-285563

(51) Int. Cl.
*G06K 15/00* (2006.01)
(52) U.S. Cl.
CPC .................................... *G06K 15/401* (2013.01)
(58) Field of Classification Search
CPC .. G06K 15/18; G06K 15/1886; G06K 15/401
USPC ............................................. 358/1.16–1.17
See application file for complete search history.

(56) References Cited

U.S. PATENT DOCUMENTS

| 5,136,688 | A | * | 8/1992 | Morikawa et al. | 358/1.16 |
|---|---|---|---|---|---|
| 5,604,846 | A | * | 2/1997 | Kadota | 358/1.16 |
| 5,898,824 | A | * | 4/1999 | Kato et al. | 358/1.16 |
| 6,552,819 | B2 | * | 4/2003 | Osawa et al. | 358/1.17 |
| 2002/0067492 | A1 | * | 6/2002 | Ueda | 358/1.9 |
| 2006/0055975 | A1 | | 3/2006 | Toda | |
| 2007/0002065 | A1 | * | 1/2007 | Otake et al. | 345/581 |
| 2007/0146785 | A1 | * | 6/2007 | Akiyama et al. | 358/1.16 |
| 2007/0292003 | A1 | * | 12/2007 | Hirabayashi | 382/120 |
| 2008/0074683 | A1 | * | 3/2008 | Yanamura et al. | 358/1.2 |
| 2009/0213406 | A1 | * | 8/2009 | Kimura | 358/1.13 |
| 2010/0287137 | A1 | * | 11/2010 | Lyakhovitskiy | 707/609 |
| 2010/0296126 | A1 | * | 11/2010 | Shiohara | 358/1.15 |

FOREIGN PATENT DOCUMENTS

| JP | 2006-076215 | 3/2006 |
|---|---|---|
| JP | 2010-074357 | 4/2010 |

* cited by examiner

*Primary Examiner* — Benny Q Tieu
*Assistant Examiner* — Quyen V Ngo

(57) ABSTRACT

An image processing apparatus includes a first storage device, a second storage device, a rendering unit, and a data handling unit. The rendering unit is configured (a) to generate intermediate data from image data, store the intermediate data in at least one of the first storage device and the second storage device, and (b) to generate bitmap image data on the basis of the intermediate data. The data handling unit is configured to select one of the first storage device and the second storage device as a storing place of the intermediate data on the basis of free area sizes of the first storage device and the second storage device and data transfer rates of the first storage device and the second storage device.

6 Claims, 2 Drawing Sheets

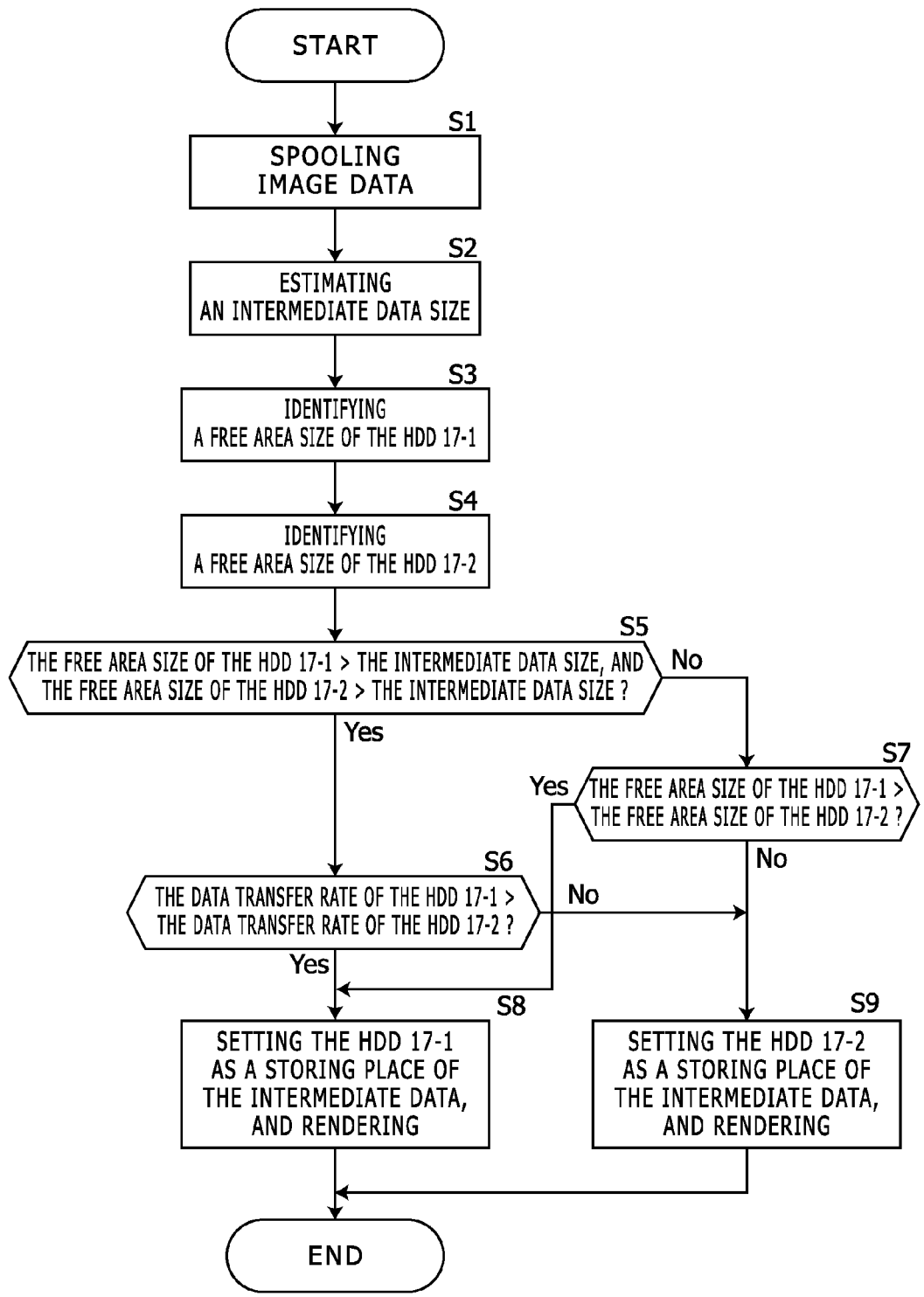

IMAGE PROCESSING APPARATUS AND IMAGE PROCESSING METHOD THAT SELECTIVELY STORES DATA IN PREFERRED STORAGE PLACES

CROSS-REFERENCE TO RELATED APPLICATIONS

This application relates to and claims priority rights from Japanese Patent Application No. 2012-285563, filed on Dec. 27, 2012, the entire disclosures of which are hereby incorporated by reference herein.

BACKGROUND

1. Field of the Present Disclosure

The present disclosure relates to an image processing apparatus and an image processing method.

2. Description of the Related Art

A printing device spools image data such as a PDF file (Portable Document Format), analyzes the image data, generates temporal intermediate data that includes the analyzing result, and subsequently performs a rendering process based on the intermediate data, and consequently generates bitmap image data corresponding to image data.

A printing device has a first mode that image data is developed from print data in a removal drive and a second mode that image data is developed from print data in a memory area inside of the printing device. If a free area size of the removal drive is sufficient to store the developed image data, the first mode is selected; and otherwise the second mode is selected.

When storing image data, another printing device stores compressed image data in storage means that is one of internal storage means and external storage means, which has a larger free area.

The aforementioned printing device selects a storage device which has a larger free area as a storing place of image data. However, if a data transfer rate of the selected storage device is low, image data may be stored in the storage device having a low data transfer rate even though the image data can be stored in a storage device having a small free area but a high data transfer rate.

SUMMARY

An image processing apparatus according to an aspect of the present disclosure includes a first storage device, a second storage device, a rendering unit, and a data handling unit. The rendering unit is configured (a) to generate intermediate data from image data, store the intermediate data in at least one of the first storage device and the second storage device, and (b) to generate bitmap image data on the basis of the intermediate data. The data handling unit is configured to select one of the first storage device and the second storage device as a storing place of the intermediate data on the basis of free area sizes of the first storage device and the second storage device and data transfer rates of the first storage device and the second storage device.

An image processing method in an image processing apparatus including a first storage device and a second storage device includes the steps of: selecting one of the first storage device and the second storage device as a storing place of intermediate data on the basis of free area sizes of the first storage device and the second storage device and data transfer rates of the first storage device and the second storage device; generating the intermediate data from image data and storing the intermediate data in the storage device currently selected in the first storage device and the second storage device; and generating bitmap image data on the basis of the intermediate data.

These and other objects, features and advantages of the present disclosure will become more apparent upon reading of the following detailed description along with the accompanied drawings.

BRIEF DESCRIPTION OF THE DRAWINGS

FIG. 2 shows a flowchart which explains a rendering process in Embodiment 1.

DETAILED DESCRIPTION

Figure 1:
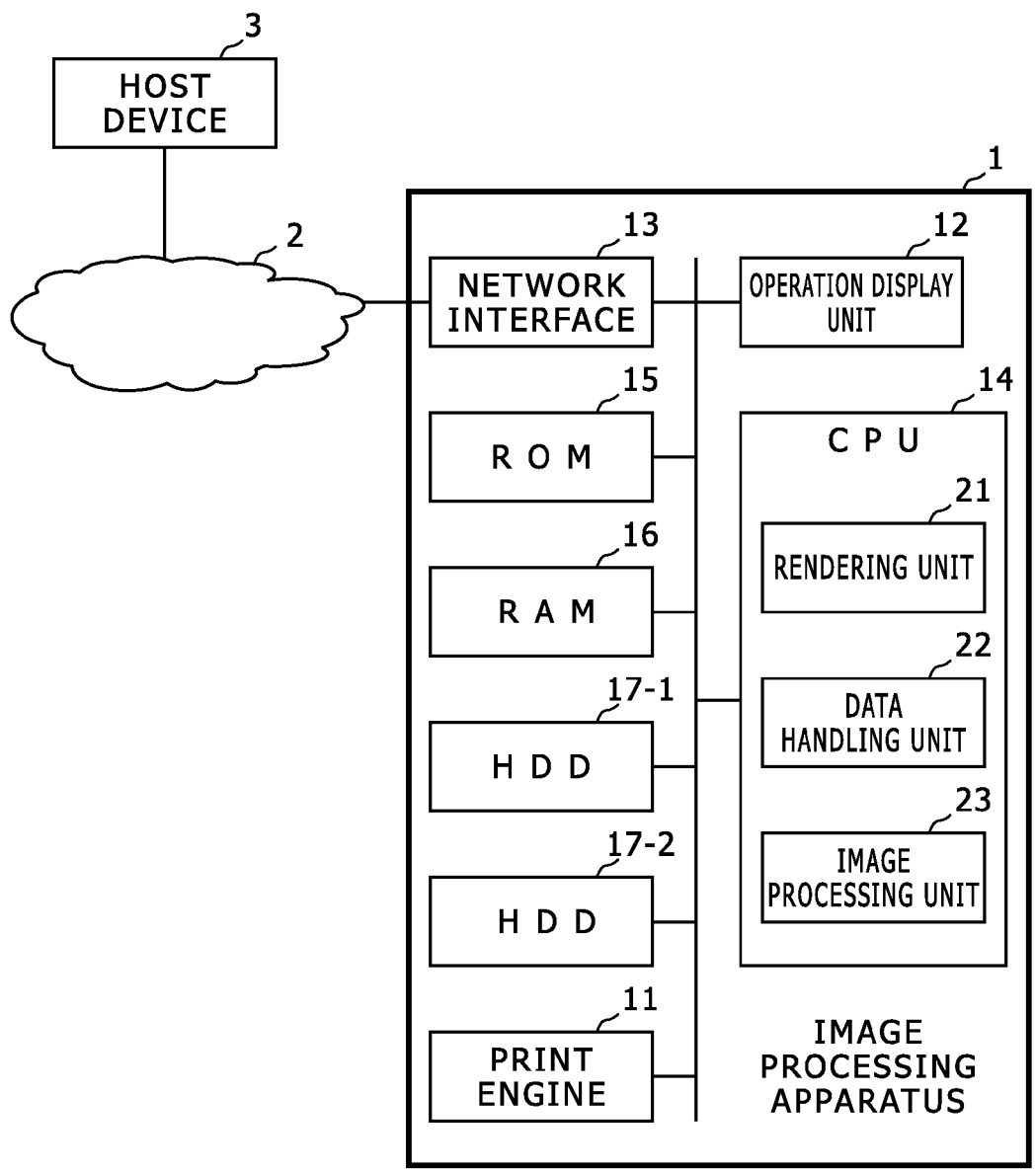
FIG. 1 shows a block diagram which indicates a configuration of an image processing apparatus according to an embodiment of the present disclosure.

Hereinafter, an embodiment according to an aspect of the present disclosure will be explained with reference to drawings.

Embodiment 1

FIG. 1 shows a block diagram which indicates a configuration of an image processing apparatus according to an embodiment of the present disclosure. The image processing apparatus 1 shown in FIG. 1 is an image forming apparatus such as a printer or a multi function peripheral, and includes a print engine 11 and an operation display unit 12. The print engine 11 performs printing an image on a paper sheet. The operation display unit 12 includes an input device that detects a user operation and a display device that display sort of information to a user.

Further, the network 2 is a LAN (Local Area Network) and/or a WAN (Wide Area Network). A host device 3 is connected to the network 2, and provides image data (e.g. a PDF file) of an image to be printed to the image processing apparatus 1. The image processing apparatus 1 includes a network interface 13 that is connected to the network 3 and capable of data communication with the host device 3 and so forth.

Further, the image processing apparatus 1 includes plural hard disk drives (HDDs) 17-1 and 17-2 as large scale data storage devices and a computer that includes a CPU (Central Processing Unit) 14, a ROM (Read Only Memory) 15 as a non volatile memory, a RAM (Random Access Memory) 16 as a volatile memory, and so forth.

The CPU 14 loads a program stored in the ROM 15, the HDD 17-1, the HDD 17-2 and so forth to the RAM 16 and executes it to form sorts of processing units. The HDD 17-1 and the HDD 17-2 are storage devices built in the image processing apparatus 1 and are used as temporal storage for image data, intermediate data, and so forth.

The CPU 14 forms a rendering unit 21, a data handling unit 22, and an image processing unit 23.

The rendering unit 21 generates intermediate data from the image data and stores the intermediate data in the HDD 17-1 and/or the HDD 17-2, and generates bitmap image data on the basis of the intermediate data. The intermediate data includes an analyzing result of the image data.

The data handling unit 22 selects one of the HDD 17-1 and the HDD 17-2 as a storing place of the intermediate data on the basis of free area sizes of the HDDs 17-1 and 17-2 and data transfer rates of the HDDs 17-1 and 17-2.

In Embodiment 1, the data handling unit 22 estimates a size of the intermediate data on the basis of the image data, (a)

select one of the HDDs 17-1 and 17-2, which has a higher data transfer rate, as a storing place of the intermediate data if both free area sizes of the HDDs 17-1 and 17-2 are larger than the estimated size of the intermediate data, and (b) select one of the HDDs 17-1 and 17-2, which has a larger free area size, as a storing place of the intermediate data if at least one of free area sizes of the HDDs 17-1 and 17-2 is not larger than the estimated size of the intermediate data.

For example, the data handing unit 22 estimates a size of the intermediate data on the basis of a content (a setting value of image resolution, an image size, and so forth) of the image data 31 (here, a PDF file).

Further, the data transfer rates of the HDDs 17-1 and 17-2 are given as data in advance, and otherwise is measured in advance and known. It should be noted that here the data transfer rate means an average writing rate to the HDD 17-1 or 17-2.

The image processing unit 23 generates print image data of each toner color of the print engine 11 by performing image processing such as color conversion, and a screening process for the bitmap image data generated by the rendering unit 21. The print engine 11 prints an image based on this print image data.

In the following part, a behavior of the aforementioned image processing apparatus is explained.

FIG. 2 shows a flowchart which explains a rendering process in Embodiment 1.

When image data is received from the host device 3, the data handling unit 22 spools the image data in one of the HDDs 17-1 and 17-2 (Step S1). After spooling the image data is finished, the data handling unit 22 estimates a size of intermediate data to be generated from the image data (Step S2).

Further, the data handling unit 22 identifies a free area size of the HDD 17-1 (Step S3), and identifies a free area size of the HDD 17-2 (Step S4).

Furthermore, the data handling unit 22 identifies whether or not both of the free area sizes of the HDDs 17-1 and 17-2 are larger than the estimated size of the intermediate data (Step S5).

If both of the free area sizes of the HDDs 17-1 and 17-2 are larger than the estimated size of the intermediate data, then the data handling unit 22 identifies whether or not the data transfer rate of the HDD 17-1 is higher than the data transfer rate of the HDD 17-2 (Step S6).

On the other hand, if at least one of the free area sizes of the HDDs 17-1 and 17-2 is not larger than the estimated size of the intermediate data, then the data handling unit 22 identifies whether or not the free area size of the HDD 17-1 is larger than the free area size of the HDD 17-2 (Step S7).

If the data transfer rate of the HDD 17-1 is higher than the data transfer rate of the HDD 17-2 in Step S6 or the free area size of the HDD 17-1 is larger than the free area size of the HDD 17-2 in Step S7, then the data handling unit 22 sets the HDD 17-1 as a storing place of the intermediate data and causes the rendering unit 21 to perform a rendering process (Step S8). In this case, the rendering unit 21 stores the intermediate data into the HDD 17-1 and generates bitmap image data from it.

Otherwise, if the data transfer rate of the HDD 17-1 is not higher than the data transfer rate of the HDD 17-2 in Step S6 or the free area size of the HDD 17-1 is not larger than the free area size of the HDD 17-2 in Step S7, then the data handling unit 22 sets the HDD 17-2 as a storing place of the intermediate data and causes the rendering unit 21 to perform a rendering process (Step S9). In this case, the rendering unit 21 stores the intermediate data into the HDD 17-2 and generates bitmap image data from it.

In the aforementioned Embodiment 1, the data handling unit 22 selects one of the HDD 17-1 and the HDD 17-2 as a storing place of the intermediate data on the basis of free area sizes of the HDDs 17-1 and 17-2 and data transfer rates of the HDDs 17-1 and 17-2.

Therefore, a suitable storage device is selected as a storing place of the intermediate data.

Embodiment 2

In Embodiment 2, the data handling unit 22 (a) selects one of the HDDs 17-1 and 17-2, which has a higher data transfer rate, as a storing place of the intermediate data if both of free area sizes of the HDDs 17-1 and 17-2 are larger than a predetermined threshold value, and (b) selects one of the HDDs 17-1 and 17-2, which has a larger free area size, as a storing place of the intermediate data if at least one of free area sizes of the HDDs 17-1 and 17-2 is not larger than the predetermined threshold value.

Other parts in the configuration and the operation of the image processing apparatus 1 in Embodiment 2 are identical to those in Embodiment 1, and therefore, they are not explained here. Incidentally, in Embodiment 2, a size of the intermediate data may not be estimated.

Embodiment 3

In Embodiment 3, the data handling unit 22 changes a storing place of the intermediate data from the selected storage device to a residual storage device in the HDD 17-1 and the HDD 17-2 if a storing area is short for the intermediate data in the selected storage device while the rendering unit 21 is performing a rendering process.

Other parts in the configuration and the operation of the image processing apparatus 1 in Embodiment 3 are identical to those in Embodiment 1 or 2, and therefore, they are not explained here.

In the aforementioned Embodiment 3, even if a storing area is short for the intermediate data while rendering, the rendering process is not stopped.

The description has been presented for purposes of illustration and description, and is not intended to be exhaustive or limited to the present disclosure.

For example, in the aforementioned Embodiment 1, 2 or 3, the HDD 17-1 and the HDD 17-2 can be selected as a storing place of the intermediate data. One or two of the HDDs 17-1 and 17-2 may be replaced with one or two non volatile memory drives such as SSD (Solid State Drive) or CF (Compact Flash). Further, one or two of the HDDs 17-1 and 17-2 may be replaced with one or two network drives connected to the network 2. In such a case, if plural protocols are available to access a network drive, it may be configured to identify respective data transfer rates of the plural protocols and regard the highest data transfer rate as the data transfer rate of the network drive.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
a first storage device;
a second storage device;
a rendering unit configured (a) to generate intermediate data from image data, store the intermediate data in at least one of the first storage device and the second storage device, and (b) to generate bitmap image data on the basis of the intermediate data; and
a data handling unit configured to select one of the first storage device and the second storage device as a storing place of the intermediate data on the basis of free area sizes of the first storage device and the second storage device and data transfer rates of the first storage device and the second storage device, wherein the data handling unit is further configured to estimate a size of the intermediate data on the basis of the image data, (a) to select one of the first storage device and the second storage device, which has a higher data transfer rate, as a storing place of the intermediate data if both of a free area size of the first storage device and a free area size of the second storage device are larger than the estimated size of the intermediate data, and (b) to select one of the first storage device and the second storage device, which has a larger free area size, as a storing place of the intermediate data if at least one of a free area size of the first storage device and a free area size of the second storage device is not larger than the estimated size of the intermediate data.

2. An image processing apparatus, comprising:
a first storage device;
a second storage device;
a rendering unit configured (a) to generate intermediate data from image data, store the intermediate data in at least one of the first storage device and the second storage device, and (b) to generate bitmap image data on the basis of the intermediate data; and
a data handling unit configured to select one of the first storage device and the second storage device as a storing place of the intermediate data on the basis of free area sizes of the first storage device and the second storage device and data transfer rates of the first storage device and the second storage device, wherein the data handling unit is further configured (a) to select one of the first storage device and the second storage device, which has a higher data transfer rate, as a storing place of the intermediate data if both of a free area size of the first storage device and a free area size of the second storage device are larger than a predetermined threshold value, and (b) to select one of the first storage device and the second storage device, which has a larger free area size, as a storing place of the intermediate data if at least one of a free area size of the first storage device and a free area size of the second storage device is not larger than the predetermined threshold value.

3. An image processing apparatus, comprising:
a first storage device;
a second storage device;
a rendering unit configured (a) to generate intermediate data from image data, store the intermediate data in at least one of the first storage device and the second storage device, and (b) to generate bitmap image data on the basis of the intermediate data; and
a data handling unit configured to select one of the first storage device and the second storage device as a storing place of the intermediate data on the basis of free area sizes of the first storage device and the second storage device and data transfer rates of the first storage device and the second storage device, wherein the data handling unit is further configured to change a storing place of the intermediate data from the selected storage device to a residual storage device in the first storage device and the second storage device if a storing area is short for the intermediate data in the selected storage device.

4. An image processing method in an image processing apparatus including a first storage device and a second storage device, comprising the steps of:
generating intermediate data from image data;
generating bitmap image data on the basis of the intermediate data;
estimating a size of the intermediate data on the basis of the image data;
selecting one of the first storage device and the second storage device as a storing place of intermediate data on the basis of free area sizes of the first storage device and the second storage device and data transfer rates of the first storage device and the second storage device; wherein said selecting step (a) will select one of the first storage device and second storage device on the basis of which has a higher data transfer rate if both of a free area size of the first storage device and a free area size of the second storage device are larger than the estimated size of the intermediate data and (b) will select one of the first storage device and second storage device on the basis of which has a larger free area size if at least one of a free area size of the first storage device and a free area size of the second storage device is not larger than the estimated size of the intermediate data; and
storing the intermediate data in the selected storage device.

5. An image processing method in an image processing apparatus including a first storage device and a second storage device, comprising the steps of:
generating intermediate data from image data;
generating bitmap image data on the basis of the intermediate data;
selecting one of the first storage device and the second storage device as a storing place of intermediate data on the basis of free area sizes of the first storage device and the second storage device and data transfer rates of the first storage device and the second storage device; wherein said selecting step (a) will select one of the first storage device and second storage device on the basis of which has a higher data transfer rate if both of a free area size of the first storage device and a free area size of the second storage device are larger than a predetermined threshold value and (b) will select one of the first storage device and second storage device on the basis of which has a larger free area size if at least one of a free area size of the first storage device and a free area size of the second storage device is not larger than the the predetermined threshold value; and
storing the intermediate data in the selected storage device.

6. An image processing method in an image processing apparatus including a first storage device and a second storage device, comprising the steps of:
generating intermediate data from image data and
generating bitmap image data on the basis of the intermediate data;
selecting one of the first storage device and the second storage device as a storing place of intermediate data on the basis of free area sizes of the first storage device and the second storage device and data transfer rates of the first storage device and the second storage device;

changing the storing place of the intermediate data from the selected storage device to a residual storage device in the first storage device and the second storage device if a storing area is short for the intermediate data in the selected storage device; and storing the intermediate data in the storage place.

\* \* \* \* \*